Sept. 8, 1953 G. A. LYON 2,651,548
WHEEL COVER
Filed Dec. 12, 1947
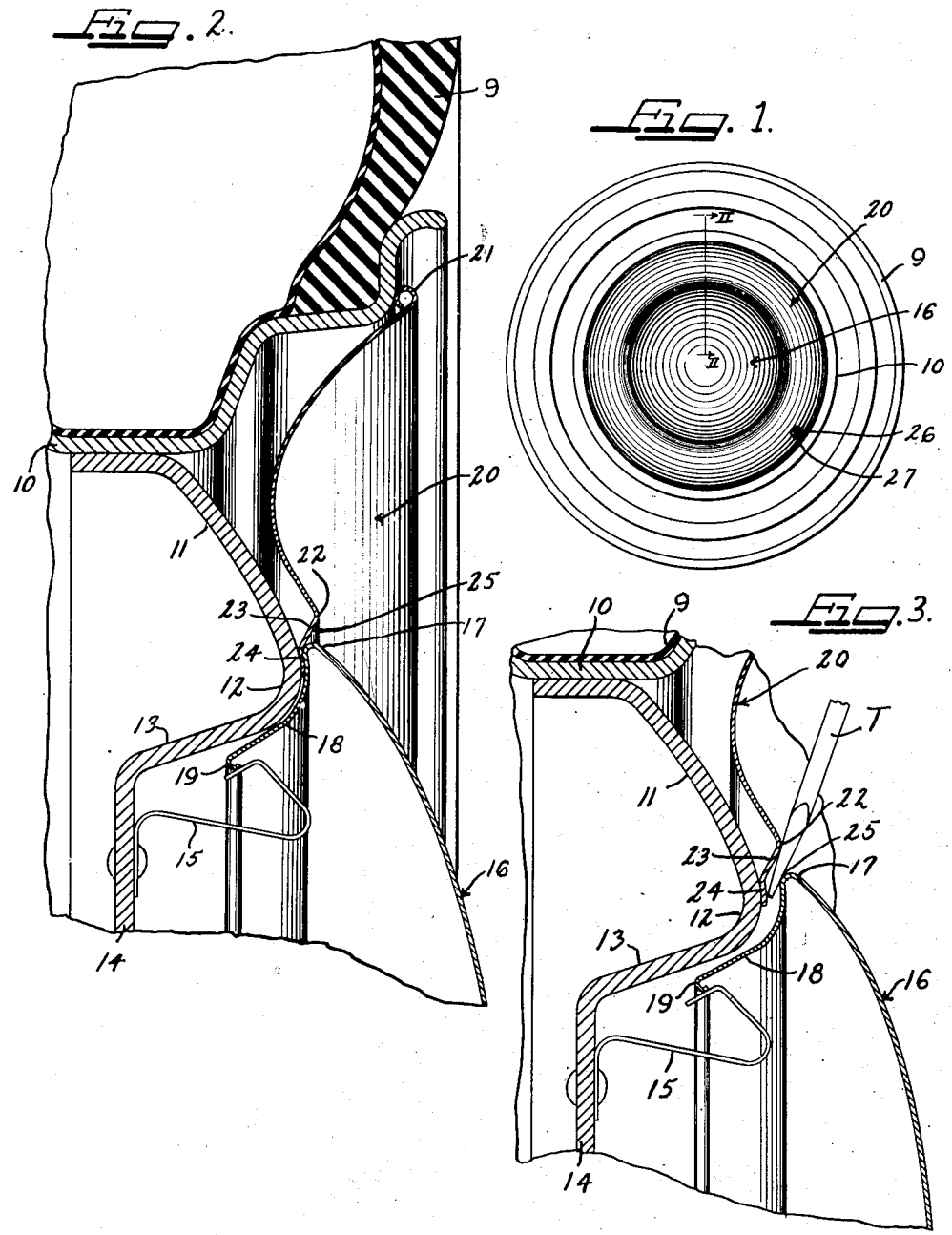
Inventor
GEORGE ALBERT LYON
by The Firm of Charles W. Hills
Attys.

Patented Sept. 8, 1953

2,651,548

UNITED STATES PATENT OFFICE 2,651,548

WHEEL COVER

George Albert Lyon, Detroit, Mich.

Application December 12, 1947, Serial No. 791,306

2 Claims. (Cl. 301—37)

1

This invention relates to ornamental trim for vehicle wheels and more particularly to an annular trim ring for a conventional automobile wheel of the so called drop center type.

An object of this invention is to provide an annular trim ring cooperable with the central hub cap in such a manner as to enable a portion of the trim ring to define a recess for receiving an outer edge of a pry off tool directly at the outer periphery of the hub cap as well as defining a rigidifying shoulder or rib on which the tool can bear in the pryoff operation.

Another object of this invention is to provide a highly ornamental rigidified metallic trim ring which lends itself to economical manufacture on a large production basis.

Yet another object of this invention is to provide an improved ornamental wheel trim ring which defines a seat for a central detachable wheel hub cap and whereby the hub cap cooperates in the retention of the trim ring on the wheel.

In accordance with the general features of this invention there is provided in a wheel structure including a wheel having flanged tire rim and body parts, as well as a central hub cap detachably retained on the body part, an annular trim ring extending beyond the hub cap over the body part and having a radially inner margin formed into a rigidifying hub cap pry off rib in close proximity to the outer edge of the cap, and a flange inclined axially rearwardly from the rib toward the body part and formed into a radially inner seat for the outer edge of the cap to bear against, the flange being axially rearwardly offset from the rib and the edge of the cap whereby it defines a recess for receiving an edge of the tool bearing on the rib for effecting removal of the cap from the wheel.

Yet another feature of the invention relates to the curving of the trim ring radially outwardly beyond the reinforcing rib so as to cause the curved portion to closely follow the contour of the wheel, and whereby no portion of the trim ring is disposed axially outwardly of the outermost edge of the wheel.

Other objects and features of this invention will more fully appear from the following detailed description taken in connection with the accompanying drawings which illustrate a single embodiment thereof and in which Figure 1 is a side view of a wheel structure having a trim ring embracing the features of this invention;

Figure 2 is an enlarged fragmentary cross sectional view taken on substantially the line II—II of Figure 1, looking in the direction indicated by the arrows; and Figure 3 is a fragmentary cross sectional view similar to Figure 2, showing a pry off tool applied to the hub cap in the process of removing the cap and showing how the pry off tool cooperates with the inner margin of the trim ring.

As shown on the drawings:

The reference character 10 designates generally a conventional multi-flanged drop center type of tire rim in which is disposed the usual pneumatic tire assembly 9.

The tire rim 10 is carried by a conventional wheel body part 11 which comprises a metallic stamping, including a central bulged nose 12, a rearwardly inclined center portion 13 and a central bolt-on flange 14 to which is riveted the conventional hub cap retaining spring clips 15. These clips are illustrated as being of the so called inverted type now in general use and may be of any suitable number, such, for example, as three to five.

Detachably cooperable in the usual way with these spring clips is a metallic hub cap 16 which is of the so called crowned type. This cap 16 comprises a metallic stamping terminating in an edge 17 turned rearwardly into an underturned skirt or flange 18 adapted to seat on the body nose 12 and including a turned edge 19 detachably cooperable with the free extremities of the retaining spring clips 15. This wheel structure thus far described is of the conventional type and is well known in the automobile industry.

My invention is concerned with the provision of a highly ornamental trim ring 20 for disposition between the outer edge of the hub cap and a side flange of the tire rim 10. This trim ring 20 may comprise a metallic stamping and may be made from any suitable steel stock, such, for example, as cold rolled steel, stainless steel or aluminum sheet. In fact, it may be made of any suitable material capable of being self-sustaining in shape and form when in use.

The trim ring 20 includes an outer turned edge 21 which may, if so desired, terminate short of the outer edge of the exposed side of the rim part. I have illustrated this edge 21 as being located opposite the outer flange of the rim part 10; but it is to be understood that its location may be varied radially inwardly or outwardly, as desired, and consistent with the appearance required of the ring.

The ring is convexly dished axially rearwardly inside of the edge 21 and terminates in a reinforcing annular pry off shoulder 22. The inner margin of the ring, in addition to the shoulder 22, has an axially rearwardly inclined flange 23 terminating generally in a radially extending flanged portion 24 comprising a seat for the hub cap. This flange 23 and seat 24 serve in centering the hub cap when it is applied to the wheel. In addition, the flange 23 defines an annular recess between the rib 22 and the outer hub cap edge 17 for receiving the end of a blunt pry off tool, such, for example, as a screw-driver, as illustrated in Figure 3, and as designated by the reference character T.

In the application of the trim ring, it will be understood that the hub cap is first removed from the wheel and the trim ring is then disposed over the outer side of the wheel with its flange 24 nested on the nose 12 of the wheel body part. Thereafter, the hub cap is placed in the center of the assembly and is pushed axially rearwardly into retaining cooperation with the spring clips 15. In the course of pushing the hub cap home, the flange 23 assists in centering the cap and aligning its edge 17 with the free extremities of the usual spring clips 15. When the hub cap is in its retained position, it bears against the flange 24, thus holding the trim ring tightly on the wheel with its outer edge 21 opposite a flange of the rim 10. This edge 21 may or may not, as desired, bear against the flange of the rim.

When it is desired to remove the hub cap, in order to have access to the usual wheel bolts (not shown) at the center of the wheel, the edge of the pry off tool T is inserted in the recess 25 and the tool is manipulated as a lever against the pry off shoulder 22 of the trim ring in the forceable ejection of the cap from its retaining cooperation with the clips.

In the event that the conventional valve stem 26 (Figure 1) extends outwardly beyond the trim ring, a hole 27 is provided in the trim ring so as to permit the stem to project therethrough. In this manner access may be had to the stem without necessitating the removal of the trim ring.

I claim as my invention:

1. In a wheel structure including a wheel having flanged tire rim and body parts and a central hub cap detachably retained on the body part, an annular trim ring extending radially outwardly beyond the hub cap over the body part and having a radially inner margin in the form of a sharp crest rigidifying hub-cap-pry-off tool leverage rib projecting axially outwardly substantially beyond and in radially outwardly spaced adjacency to the outer edge of the hub cap, the radially inner side of said rib being inclined axially and radially inwardly toward the body part and terminating in a radially inwardly extending seat for the outer edge of the hub cap to bear against and clamped against the wheel body by the hub cap, the trim ring radially outwardly of said rib extending into radially outwardly and axially inwardly offset relation to the crest of the rib so as to afford complete pry-off tool leverage clearance, the hub cap being the sole means for holding the trim ring on the wheel.

2. In a wheel structure including a wheel having flanged tire rim and body parts and a central hub cap detachably retained on the body part, an annular trim ring extending radially outwardly beyond the hub cap over the body part and having a radially inner margin in the form of a sharp crest rigidifying hub-cap-pry-off tool leverage rib projecting axially outwardly substantially beyond and in radially outwardly spaced adjacency to the outer edge of the hub cap, the radially inner side of said rib being inclined axially and radially inwardly toward the body part and terminating in a radially inwardly extending seat for the outer edge of the hub cap to bear against and clamped against the wheel body by the hub cap, the trim ring radially outwardly of said rib extending into radially outwardly and axially inwardly offset relation to the crest of the rib so as to afford complete pry-off tool leverage clearance, the radially outer portion of said trim ring being dished from the rib to the radially outer edge of the trim ring, and said radially outer edge being turned under and disposed opposite a flange of the rim part, the hub cap being the sole means for holding the trim ring on the wheel.

GEORGE ALBERT LYON.

References Cited in the file of this patent

UNITED STATES PATENTS

| Number | Name | Date |
|---|---|---|
| 2,043,874 | Zerk | June 9, 1936 |
| 2,136,137 | Kellogg | Nov. 8, 1938 |
| 2,214,746 | Lyon | Sept. 17, 1940 |
| 2,368,230 | Lyon | Jan. 30, 1945 |